UNITED STATES PATENT OFFICE.

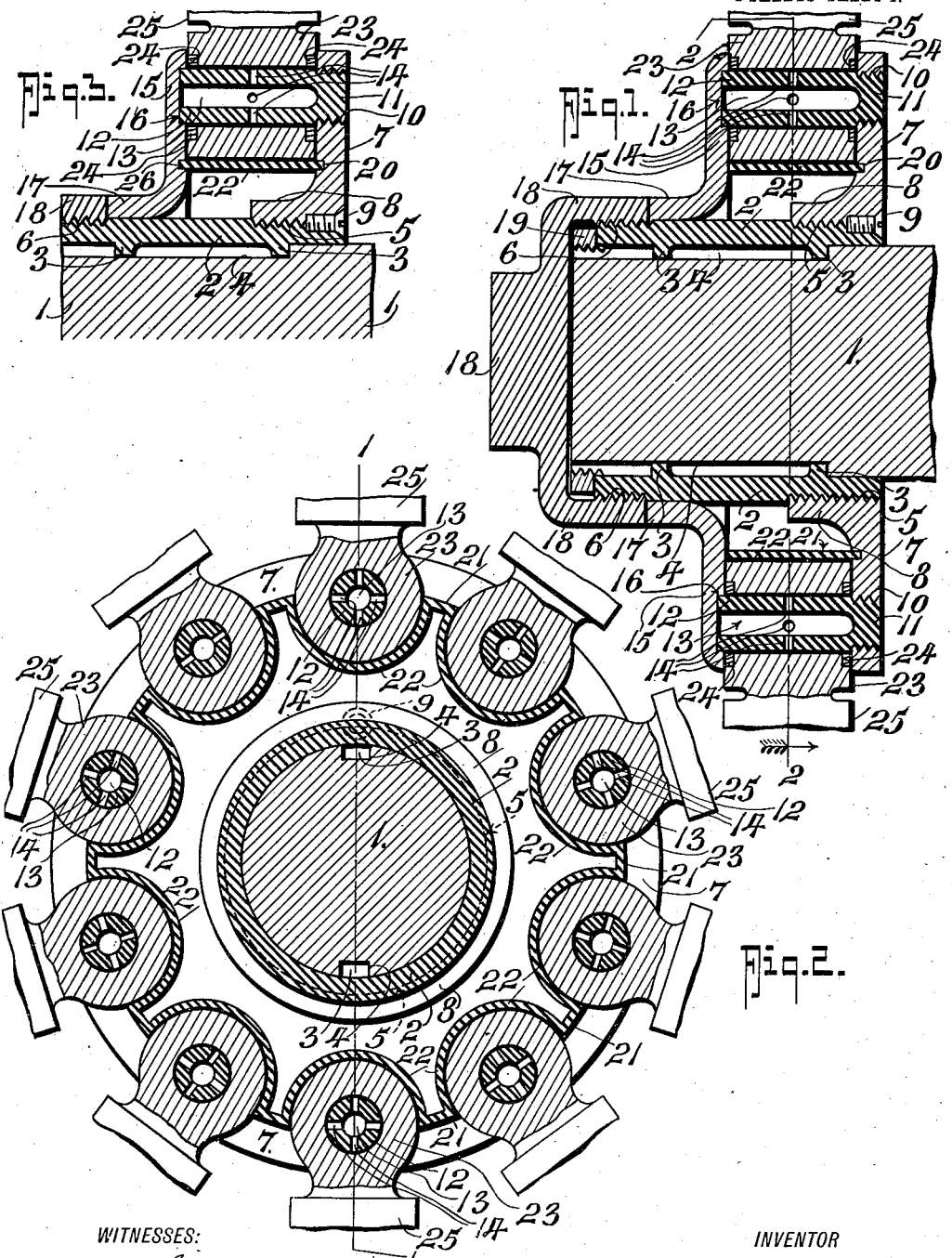

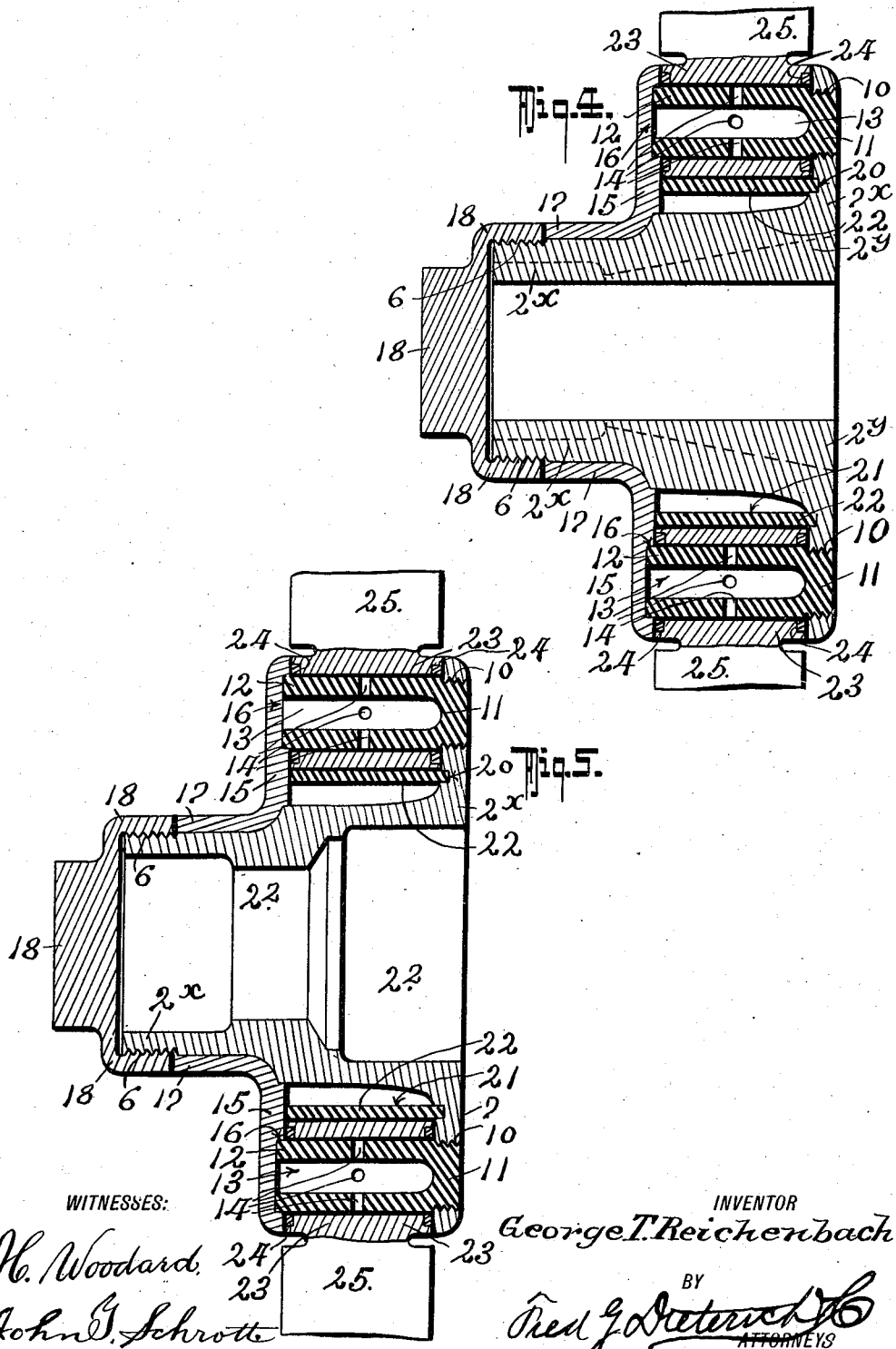

GEORGE T. REICHENBACH, OF NEW CASTLE, DELAWARE, ASSIGNOR TO H. O. PECK AUTOMOBILE WHEEL COMPANY, INCORPORATED, OF PORTLAND, OREGON.

VEHICLE WHEEL-HUB.

1,014,177. Specification of Letters Patent. Patented Jan. 9, 1912.

Application filed February 25, 1911. Serial No. 610,798.

*To all whom it may concern:*

Be it known that I, GEORGE T. REICHENBACH, residing at New Castle, in the county of Newcastle and State of Delaware, have invented certain new and useful Improvements in Vehicle Wheel-Hubs, of which the following is a specification.

This invention relates to that class of hubs which are especially adapted for use in spring or resilient spoke wheels, and the present invention particularly has for its object to provide a hub that is light, and inexpensive to manufacture, but is withal, strong and effective, and is especially useful in wheels of the Peck type, such as are disclosed in Patents No. 925,021, issued June 15, 1909; No. 925,022, issued June 15, 1909; No. 934,566, issued September 21, 1909; No. 943,563, issued December 14, 1909 and No. 943,564, issued December 14, 1909.

In the Peck type of wheel, the hub and rim are joined by spokes whose tendency is to continuously exert a pulling force between the hub and rim, the spokes being so designed that in starting they may be practically all put under maximum tension to form, as it were, a rigid spoke wheel. To do this the connection between the hub and spoke must allow considerable pivotal movement whereby the spokes will assume a substantially tangential relation to the hub when under full tension and whereby the spokes are set substantially radial to the hub under normal running conditions. The hub of the present invention has been devised and designed to fulfil these requirements, and to that end a sleeve is provided to fit on the shaft, on which sleeve a disk is rigidly although preferably removably secured, while a second disk is fitted on the sleeve to oppose the first disk. It is between these disks that the spoke heads are mounted. One of the disks has threaded holes into which the pivot pins are tapped, while the other disk has corresponding sockets to receive the free ends of the pins. The pins are counterbored from the free ends to form grease pockets from which the grease flows through small apertures in the pins to the bearing surfaces of the spoke heads to lubricate the same.

In order to render the space between the disks dust-proof and also to prevent dirt adhering to the spoke heads, an annular thin metal partition having pocket-like portions to receive the spoke heads is placed between the disks and held in position in a convenient manner.

The invention also includes those novel details of construction, combination and arrangement of parts, all of which will be first fully described, then be specifically pointed out in the appended claims, and illustrated in the accompanying drawings, in which:

Figure 1, is a vertical cross section on the line 1—1 of Fig. 2. Fig. 2, is a vertical longitudinal section on the line 2—2 of Fig. 1. Fig. 3, is a detail vertical cross section showing a slight modification of the invention. Fig. 4, is a view similar to Fig. 1 of a modification of the invention, showing the hub before being bored out to fit the axle. Fig. 5, is a view similar to Fig. 4, showing the hub bored out to fit an axle of different form from that disclosed in Fig. 1.

Referring now to the accompanying drawings, in which like letters and numerals of reference indicate like parts in all of the figures, 1 designates the axle of the vehicle on which the improved hub is mounted in any desired way. The hub which constitutes this invention includes a sleeve 2 which may have inner lugs 3 to enter key grooves 4 in the axle 1 and which has externally threaded ends 5—6.

7 is a disk whose hub portion 8 is threaded onto the sleeve 2 and keyed thereto by a set screw 9, or its equivalent. The disk 7 has a set of tapped holes 10 to receive the threaded ends 11 of the spoke socket receiving pins 12. The pins 12 are preferably provided with bores 13 that extend into the pins from the free ends and are adapted to receive grease, or other suitable lubricant, the lubricant being conveyed to the bearing surfaces of the pin by one or more small bores 14.

15 is a disk that is held on the sleeve 2 opposite the disk 7 and the disk 15 has a set of sockets 16 for the free ends of the pins 12 thereby not only forming a rigid holding device for the pins, but serving also as a cap to close the bores 13 of the pins 12. The disk 15 has a hub 17 to receive the sleeve 2. A cap 18, or other suitable device, is threaded onto the ends of the sleeve 2 to hold the disk 15 in tight engagement with the pins 12.

The spokes 25, which may be of any type, preferably those disclosed in the Peck patents aforesaid, have the bearing heads 23 bored to receive the pins 12 and they are preferably provided with washers 24 to retain the lubricant and prevent accumulation of dirt and dust in the bearing surfaces of the spoke heads 23 and the pins 12.

In order to prevent access of dust and dirt into the hub between the disks 7 and 15, so as to clog the spokes and interfere with their action, a thin metal diaphragm or web 21 is introduced between the disks 7 and 15, which diaphragm is of a generally annular form and of a radius preferably equal to or not exceeding that of the distance between the center of the hub and the centers of the pins 12. The web 21 has spoke head pockets 22 formed to closely embrace the spoke heads. The web 21 may be simply held in place by friction, although it is believed preferable to provide one of the disks, say disk 7, with a shallow groove 20, to receive one edge of the web 21, as shown in Fig. 1 of the drawings, and thus act as a retainer. If desired both disks 7 and 15 may have grooves 20 and 26 respectively for the web 21 as shown in Fig. 3.

A jam ring 19 on the axle 1 may be employed to retain the hub on the axle.

From the foregoing it will be seen a hub has been provided that will be light and strong, easy to manufacture and repair, if necessary, and by the use of it a maximum turning effect of the spoke heads 23 on the pins 12 can be had when the hub is used in wheels of the Peck type. By this construction also, the pins 12 cannot work loose. However, should they tend to turn in one direction, let us say to tend to thread the pins into the disk 7, the pins would only more tightly engage the disk 7, while if the tendency be to turn the pins 12 in a direction that would unthread them they will the more tightly engage the disk 15 and thus be prevented from turning, thereby avoiding all danger of loosening up the pins when the hub is in use.

If desired, the sleeve $2^x$ and disk $7^x$ may be formed integrally, as shown in Figs. 4 and 5, and when so formed, a sufficient thickness of metal $2^y$ is left so that the sleeve $2^x$ may be bored out, as at $2^y$, Fig. 5, to fit any size and style of shaft, depending on the particular make of vehicle on which the invention is applied.

From the foregoing description, taken in connection with the accompanying drawings, it is thought the complete construction, operation and numerous advantages of my invention will be readily understood by those skilled in the art to which the invention appertains.

What I claim is:

1. A vehicle wheel hub that includes a shaft engaging sleeve, a disk secured to said sleeve, a second disk mounted on said sleeve and spaced from said first mentioned disk, one of said disks having a set of pin receiving apertures, pins secured in said apertures, the other disk having pin receiving recesses into which said pins project, spoke heads mounted on said pins between said disks and a cap secured on said sleeve to hold said second mentioned disk in engagement with said pins together with an annular thin metal partition held between said disks, and engaging said spoke heads.

2. In a vehicle wheel hub, a sleeve, a disk threaded onto said sleeve, a second disk mounted on said sleeve and spaced from said first mentioned disk, a set of spoke engaging pins threaded into one of said disks and projecting toward the other disk, said other disk having pin receiving recesses, said pins having longitudinal bores entering from one end and having other bores for effecting communication between said longitudinal bores and the outside of said pins, said second disk forming a closure for the open ends of said longitudinal pin bores.

3. A vehicle wheel hub that includes a shaft engaging sleeve, a disk secured to said sleeve, a second disk mounted on said sleeve and spaced from said first mentioned disk, one of said disks having a set of pin receiving apertures, pins secured in said apertures, the other disk having pin receiving recesses into which said pins project, a cap secured on said sleeve to hold said second mentioned disk in engagement with said pins, spoke heads having bearing apertures to receive said pins and mounted between said disks, and a thin metal partition between said disks, said partition having pocket portions to receive said spoke heads.

4. In a hub, a sleeve having externally threaded ends, a disk having a hub threaded onto one of said ends and keyed thereto, said spoke having a set of threaded pin receiving openings, a set of spoke engaging pins threaded into said openings, said pins having a bore extending into the respective pins from their free ends, a cap disk loosely fitted on said sleeve and having recesses to receive the open ends of said pins and form caps therefor, means for securing said last named disk in position on said sleeve, said pins having supplemental bores for effecting communication between said first mentioned pin bores and the outside of said pins, spoke heads having bearing apertures to receive said pins and mounted between said disks and a thin metal partition between said disks, said partition having pocket portions to receive said spoke heads.

5. A vehicle wheel hub that includes a shaft receiving sleeve having a disk at one end, a second disk mounted on said sleeve and spaced from said first mentioned disk, spoke heads pivotally mounted between said disks, and a thin metal web held between said disks and shaped to closely conform to the curvature of said spoke heads to form pockets in which said spoke heads are located.

GEORGE T. REICHENBACH.

Witnesses:
A. E. DIETERICH,
FRED G. DIETERICH.

Copies of this patent may be obtained for five cents each, by addressing the "Commissioner of Patents, Washington, D. C."